April 3, 1962 L. P. SITTIG 3,027,656
SATELLITE GLOBE
Filed April 6, 1960 2 Sheets-Sheet 1

Inventor.
Lewis P. Sittig
By Lee & Lee
Attys.

April 3, 1962 L. P. SITTIG 3,027,656
SATELLITE GLOBE
Filed April 6, 1960 2 Sheets-Sheet 2

Inventor:
Lewis P Sittig
By Lee & Lee
Attys.

United States Patent Office 3,027,656
Patented Apr. 3, 1962

3,027,656
SATELLITE GLOBE
Lewis P. Sittig, 317 Loy St., Lombard, Ill.
Filed Apr. 6, 1960, Ser. No. 20,385
11 Claims. (Cl. 35—46)

The invention relates generally to geographical globes and the like and more particularly to a globe structure which incorporates a movable satellite.

The invention has among its objects the production of a globe structure which may be motor driven and provided with a satellite which is rotatable about the globe, and which if desired may be constructed to have an orbital path rather than a circular path, whereby the distance between the globe surface and the satellite may vary in manner similar to satellites propelled from the earth's surface.

Another object of the invention is the production of a satellite globe having such features which is extremely simple in construction, relatively inexpensive to manufacture, durable and substantially fool-proof.

A further object of the invention is the production of such a satellite globe structure in which the orbital axis of the satellite may be varied with respect to the axis of the globe.

Many other objects and advantages of the construction herein shown and described will be obvious to those skilled in the art from the disclosure herein given.

In the drawings, wherein like reference characters indicate like or corresponding parts:

FIG. 3 is a sectional view taken approximately on the line 3—3 of FIG. 2;

FIG. 4 is a sectional view taken approximately on line 4—4 of FIG. 2; and

FIG. 5 is a sectional view taken approximately on the line 5—5 of FIG. 2.

The present invention contemplates the utilization of a globe structure which is adapted to be rotated on its polar axis by suitable means and a satellite supporting structure including drive means operatively connected to the motor for moving the satellite in an orbital path with respect to the globe.

Figure 1:
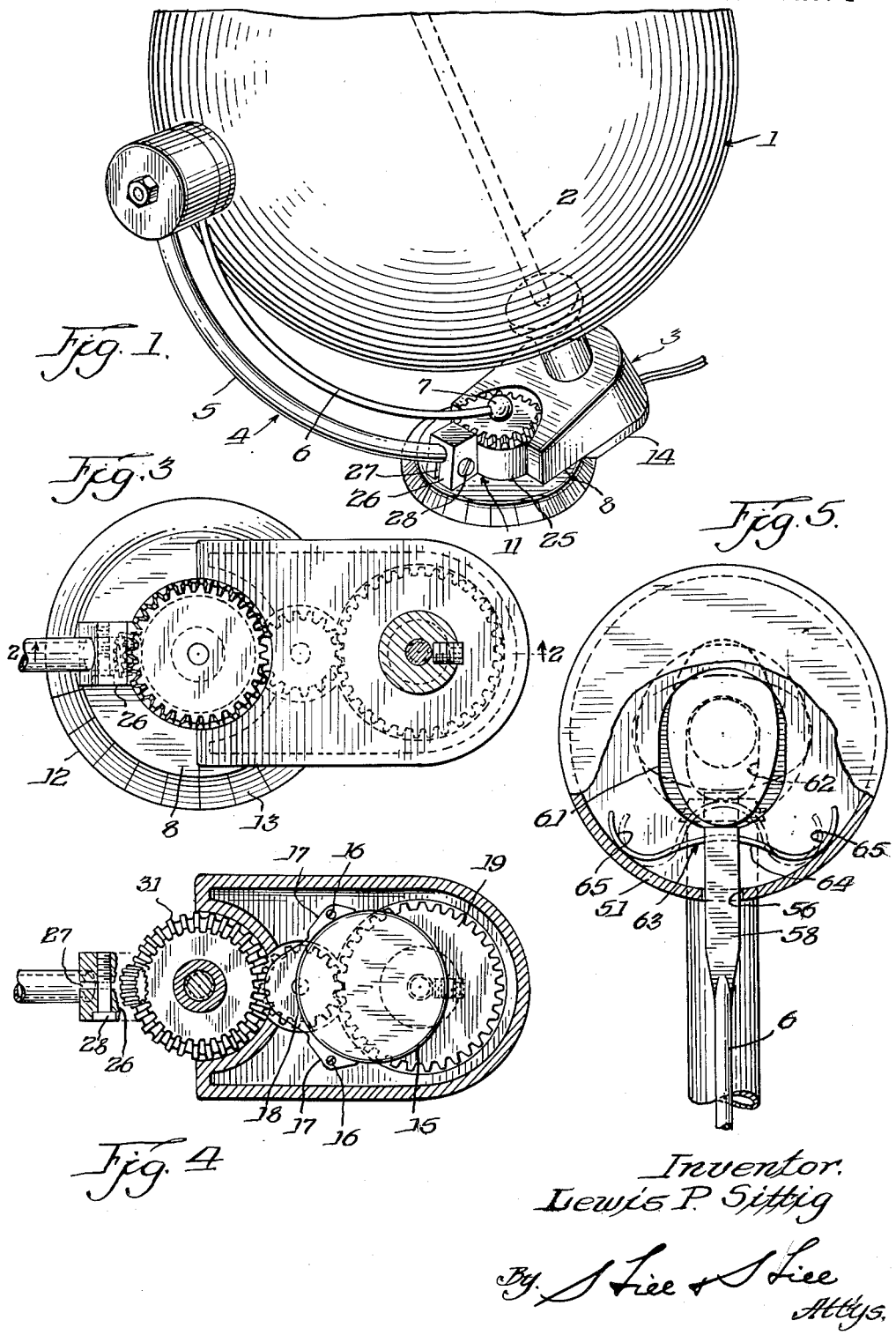
FIG. 1 is a perspective view of a globe structure embodying the present invention, the upper portion of the globe structure being omitted.

Thus referring to FIG. 1, the reference numeral 1 indicates generally a globe which is rotatable about the axis of a spindle 2, which is illustrated as forming the polar axis of the globe 1, which in turn is supported on a base structure indicated by the numeral 3 adapted to house power means for rotating the globe, the base carrying a satellite supporting structure 4, illustrated as comprising an arcuate-shaped supporting member 5 operatively connected at its lower end to the base 3 and carrying at its upper end an arcuate-shaped satellite supporting arm 6 which carries a satellite 7 at its free end, the opposite end being operatively connected to the free end of the member 5, whereby the arm 6 may be rotated about an axis intersecting the center of the globe. The arrangement preferably is such that the member 5 may also be rotated about a generally vertical axis which may intersect the center of the globe. The arm 6 preferably is moved by suitable power means, as for example, that employed to rotate the globe 1, whereby the satellite 7 may move around the globe. Means also may be provided with imparting a movement of the arm 6 during its revolution about the globe, whereby the satellite 7 is also given a radial movement toward and away from the surface of the globe as it travels around the same.

Figure 2:
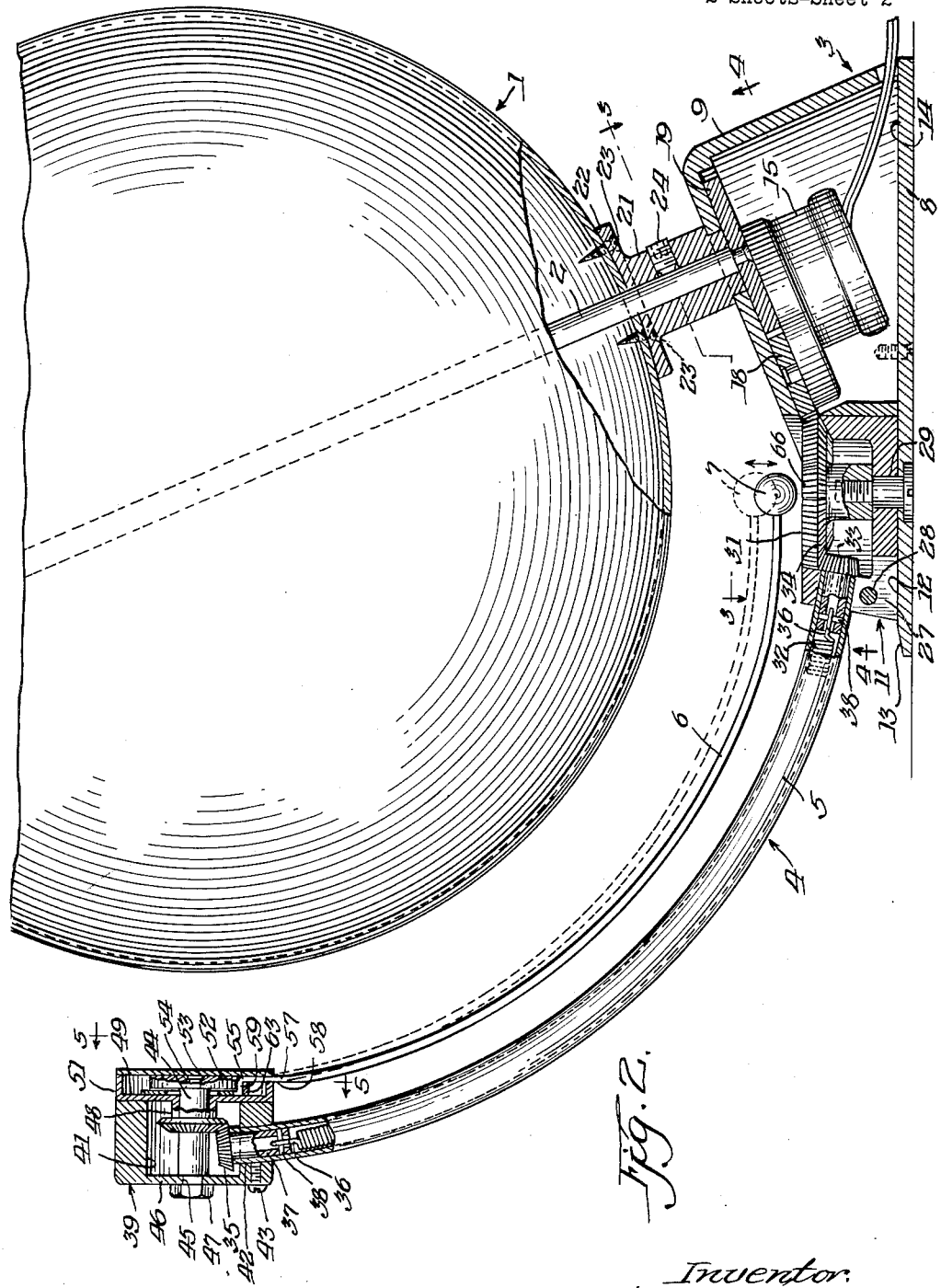
FIG. 2 is a side elevational view of the globe structure with portions of the operating mechanism illustrated in section, taken approximately on the line 2—2 of FIG. 3.

Referring more particularly to FIGS. 2 through 4, the base 3 is provided with a bottom plate 8 on which is mounted a hollow housing 9 and a swivel block indicated generally by the numeral 11. As illustrated in FIG. 3, the bottom plate 8 is of generally keyhole shape, having a circular portion 12 which is provided with a beveled edge 13 and a generally radially extending portion 14.

Mounted in the housing 3 is a suitable motor 15 which may be mounted to the housing by any suitable means, as for example, screws 16 passing through flanges 17 formed on the motor. The latter is provided with a driving pinion 18 which is operatively meshed with a driven gear 19 rigidly mounted on the spindle 2, the globe 1 being rigidly connected to the spindle by means of a collar 21 having a flange 22 which seats upon the globe and is secured thereto by suitable means such as screw 23 passing through the flange and into the globe structure. The collar 21 is illustrated as being rigidly secured to the spindle 2 by suitable means such as a set screw 24.

As illustrated in FIGS. 1 and 4, the block 11 is provided with a generally cylindrical portion 25 and a radially extending portion 26 which is bifurcated as indicated at 27, forming a clamp adapted to receive the adjacent end of the supporting member 5, the parts being locked in assembled relation by a clamp screw 28 which passes through the adjacent clamping leg and is threaded into the opposite leg, whereby the supporting member 5 may be rigidly clamped to the block 11.

The block 11 is supported on the bottom plate 8 for swiveling movement about the axis of a shouldered mounting screw 29 which extends through the plate and the block and is threaded into a gear member 31.

The tube 5 forms a housing for a flexible shaft 32 disclosed in the drawings as comprising a suitable spring member operatively connected at the end of the tube 5 mounted on the block 11 to a bevel gear 33 which meshes with cooperative teeth 34 on the gear 31. The opposite end of the shaft 32 is operatively connected to a similar bevel gear 35. The shaft 32 is illustrated as being formed with loops or eyes 36 positioned within the hollow hub 37 of each gear 33 or 35, and secured thereto by pins 38 extending through the eye of the shaft.

Mounted on the free end of the tube 5 is a housing indicated generally by the numeral 39, the latter as clearly illustrated in FIGS. 1 and 5 being cylindrical in shape and having a hollow interior 41. The housing is provided with a bore 42 in the peripheral wall thereof of a size to receive the adjacent end of the tube 5 which may be locked in place by suitable means such as a screw 43 which is adapted to seat upon the tube, thereby clamping it in place.

Mounted on the housing 39 is a shouldered shaft 44, the latter having a threaded stem 45 which extends through the end wall 46 of the housing and is secured thereto by suitable means such as a nut 47. Rotatably mounted on the shaft 44 is a bevel gear 48 which is meshed with the gear 35, the gear 48 having a disk 49 rigidly carried thereby which in turn is provided with a peripheral flange 51. Rigidly mounted on the shaft 44 is a generally elliptically shaped cam 52, the latter being illustrated as provided with a countersunk bore 53 of a size to receive a shank 54 formed on the adjacent end of the shaft 44 and flared over to form a rivet operative to hold the cam rigidly on the shaft. The housing formed by the disk 49 is closed by a cover plate 55 which is rigidly mounted on the cam 52 and thus supported by the shaft 44.

As illustrated in FIGS. 2 and 5, the peripheral wall 51 of the disk 49 is provided with a slot 56 therein of a size to receive the adjacent end 57 of the satellite supporting arm 6, the latter being illustrated in FIGS. 2 and 5 as being generally circular in cross section throughout the major portion of its length and flattened at its mounting end as indicated at 58, such flattened portion being of generally rectangular cross section and provided with an offset 59 therein adapted to bear on the periphery of the cam 52, the adjacent end of the arm being enlarged as indicated at 61 in FIG. 5, which enlarged portion is provided with a slot 62 therein of a size to receive the adjacent portion of the shaft 44. Thus the arm 6 is provided with a limited radial movement with respect to the axis of the shaft 44, but is otherwise fixed wtih respect to the bevel gear 48 and will rotate with the latter and the plate 49. The offset 59 of the arm 6 is maintained in engagement with the cam 52 by a resilient element or spring 63, illustrated as being formed from strip stock and being of a generally double S shape, having a central U-shaped portion 64 and two reversely formed outer portions 65, the central portion 64 bearing against the adjacent face of the offset 59 and the two outer portions 65 bearing against the adjacent flange or wall 51, as clearly illustrated in FIG. 5, which discloses in solid lines the position of the spring 63 and arm 6 when the offset 59 is engaging the high point of the cam, whereas the relative positions of the parts are illustrated in dotted lines as when the offset is riding on the narrow portion of the cam. However, in such case the cam 52 is fixed rigidly in a vertical position as illustrated in solid lines in FIG. 5, the arm 6 would have to be in a horizontal position or at substantially ninety degrees to the position illustrated in FIG. 5.

The action of the cam 52 is such as to impart a radial movement to the satellite 7 carried at the free end of the supporting arm 6, the amount of such movement being illustrated in FIG. 2 in dotted lines, it being remembered, as in the case of FIG. 5, that the satellite will be at its closest points to the globe when the arm 6 is in a horizontal position rather than that illustrated in FIG. 2. The particular action of the satellite will of course depend upon the position of the cam 52 and if any particular movement is desired, the cam may be rotated about the axis of the shaft 44 and locked in any desired position so that by mounting the cam with its long axis extending horizontally as illustrated in dotted lines in FIG. 5, the short axis of the satellite's orbit about the globe would extend vertically.

Assuming that the pinion 18 driven by the motor 15 rotates at 5 r.p.m., the relative sizes of the gears 19 and 31 are such that the gear 19 and thus the globe 1 will rotate at approximately 2½ r.p.m., while the gear 31, which is provided with teeth 66 suitably meshed with the pinion 18, will rotate at approximately 3 r.p.m., the bevel gear 48 and the satellite supporting arm 6 rotating at just under 6 r.p.m. or a little better than twice the speed of rotation of the globe 1. As such action takes place and the supporting arm 6 rotates about the axis of the shaft 44, the satellite will follow an elliptical orbit as determined by the shape of the cam 52.

It will be noted that the orbit of the satellite 7 may be varied by swiveling the block 11 about its axis, thereby moving the plane of the supporting member 5 in an axis intersecting the center of the globe. Thus the position of the orbital plane of the satellite may be varied with respect to the polar axis of the earth and by adjustment of the cam 52, the long axis of such orbit may be accordingly varied.

It will be particularly noted from the above description that I have provided a satellite globe construction which is relatively simple and durable, simple gear mechanisms being employed and providing novel means for achieving an elliptical orbit or the like.

Having thus described my invention, it will be obvious that various immaterial modifications may be made in the same without departing from the spirit of my invention; hence I do not wish to be understood as limiting myself to the exact form, arrangement and combination of parts shown and described, or uses mentioned.

I claim:
1. In a satellite globe structure, the combination of a base structure, a globe rotatable on its polar axis and supported by said base structure, an arcuate satellite supporting member carried by said base structure and extending concentrically wtih respect to said globe, an arcuate satellite supporting arm rotatably carried by the free end of said satellite supporting member for rotation on an axis intersecting the center of said globe, a spherical satellite carried by said arm at the free end thereof, power means carried by said base structure, means operatively connecting the power means to said globe to rotate the latter on its polar axis, means operatively connecting said power means to said satellite supporting arm to rotate the latter about said intersecting axis, and further means associated with said arm for effecting radial movement of said satellite with respect to the globe.

2. In a satellite globe structure, the combination of a base structure, a globe rotatable on its polar axis and supported by said base structure, an arcuate satellite supporting member carried by said base structure and extending concentrically with respect to said globe, an arcuate satellite supporting arm rotatably carried by the free end of said satellite supporting member for rotation on an axis intersecting the center of said globe, a spherical satellite carried by said arm at the free end thereof, power means carried by said base structure, means operatively connecting the power means to said globe to rotate the latter on its polar axis, means operatively connecting said power means to said satellite supporting arm to rotate the latter about said intersecting axis, and cam means operatively connecting said arm and member for effecting radial movement of said satellite with respect to the globe.

3. In a satellite globe structure, the combination of a base structure, a globe rotatable on an axis and supported by said base structure, an arcuate hollow satellite supporting member carried by said base structure and extending concentrically with respect to said globe, an arcuate satellite supporting arm rotatably carried by the free end of said satellite supporting member for rotation on an axis intersecting the center of said globe, a spherical satellite carried by said arm at the free end thereof, power means carried by said base structure, means operatively connecting the power means to said globe to rotate the latter on its polar axis, and means disposed in said hollow supporting member operatively connecting said power means to said satellite supporting arm to rotate the latter about said intersecting axis.

4. In a satellite globe structure, the combination of a base structure, a globe rotatable on its polar axis and supported by said base structure, an arcuate satellite supporting member, means for supporting said member on said base structure for pivotal movement about an axis intersecting said globe and extending concentrically with respect to said globe, an arcuate satellite supporting arm rotatably carried by the free end of said satellite supporting structure member for rotation on an axis intersecting the center of said globe, a spherical satellite carried by said arm at the free end thereof, power means carried by said base structure, means operatively connecting the power means to said globe to rotate the latter on its polar axis, and means operatively connecting said power means to said satellite supporting arm to rotate the latter about its rotational axis, further means associated with said arm for effecting radial movement of said satellite with respect to the globe, pivotal movement of said supporting member being operable to shift the position of the rotational axis of said supporting arm, and means for retaining said supporting member in any of its adjusted positions.

5. In a satellite globe structure, the combination of a hollow base, a globe rotatable on its polar axis and supported by said base, a motor carried in said base, gearing operatively connecting said motor and globe for rotating the latter at a relatively slow speed, a supporting block pivotally carried by said base structure on an axis intersecting the center of said globe, an arcuately shaped tubular satellite supporting member connected at its lower end to said block, a gear rotatable on the pivoted axis of said block and operatively connected to said motor, means carried by the free end of said supporting member for rotatably supporting a gear for rotation about an axis intersecting the center of said globe, a torque spring rotatable in said supporting member, gear means operatively connecting the adjacent end of said spring to the gear associated with said block, gear means operatively connecting the opposite end of said spring with the gear carried at the free end of said supporting member for rotating the latter gear at a relatively fast speed, a satellite, an arcuate satellite supporting arm at one end of which is carried said satellite, means carried by said last-mentioned gear for supporting said arm at the opposite end thereof for rotation about said last-mentioned gear axis with said arm being radially movable relative to such axis, an elliptical cam carried by the supporting means for said last-mentioned gear, said arm having a transversely extending offset engageable with said cam, and spring means engageable with said arm, operative to maintain said offset in engagement with said cam, whereby said satellite will revolve in an elliptical orbit around said globe at a higher speed than the rotation of the latter.

6. In a satellite globe structure, the combination of a hollow base, a globe rotatable on its polar axis and supported by said base, a motor carried in said base, gearing operatively connecting said motor and globe for rotating the latter at a relatively slow speed, a supporting block pivotally carried by said base structure on an axis intersecting the center of said globe, an arcuately shaped tubular satellite supporting member connected at its lower end to said block, a gear rotatable on the pivoted axis of said block and operatively connected to said motor, means carried by the free end of said supporting member for rotatably supporting a gear for rotation about an axis intersecting the center of said globe, a torque spring rotatable in said supporting member, gear means operatively connecting the adjacent end of said spring to the gear associated with said block, gear means operatively connecting the opposite end of said spring with the gear carried at the free end of said supporting member for rotating the latter gear at a relatively fast speed, a satellite, an arcuate satellite supporting arm at one end of which is carried said satellite, and means carried by said last-mentioned gear for supporting said arm at the opposite end thereof for rotation about such gear axis.

7. In a satellite globe structure, the combination of a base, a globe rotatable on an axis and supported by said base, a motor carried by said base, gearing operatively connecting said motor and globe for rotating the latter at a relatively slow speed, an arcuately shaped tubular satellite supporting member operatively connected at its lower end to said base, means carried by the free end of said supporting member for rotatably supporting a gear for rotation about an axis intersecting the center of said globe, a torque spring rotatable in said supporting member, gear means operatively connecting the adjacent end of said spring to said motor, gear means operatively connecting the opposite end of said spring with the gear carried at the free end of said supporting member for rotating the latter gear at a relatively fast speed, a satellite, an arcuate satellite supporting arm at one end of which is carried said satellite, means carried by said last-mentioned gear for supporting said arm at the opposite end thereof for rotation about such gear axis with said arm being radially movable relative to such axis, and means associated with said last-mentioned supporting means for imparting radial movement to said arm, whereby the satellite will revolve in an elliptical orbit around said globe at a higher speed than the rotation of the latter.

8. In a satellite globe structure, the combination of a base, a globe rotatable on an axis and supported by said base, means for rotating said globe at a relatively slow speed, an arcuately shaped tubular satellite supporting member connected at its lower end to said base, a satellite, an arcuate satellite supporting arm at one end of which is carried said satellite, supporting means for rotating said arm about an axis intersecting said globe with said arm being radially movable relative to such axis, an elliptical cam carried by the supporting means for said arm, said arm having a transversely extending offset engageable with said cam, and spring means engageable with said arm, operative to maintain said offset in engagement with said cam, whereby said satellite will revolve in an elliptical orbit around said globe at a higher speed than the rotation of the latter.

9. In a satellite globe structure, the combination of a base, a globe rotatable on an axis and supported by said base, means for rotating said globe at a relatively slow speed, an arcuately shaped tubular satellite supporting member connected at its lower end to said base, a satellite, an arcuate satellite supporting arm at one end of which is carried said satellite, supporting means for rotating said arm about an axis intersecting said globe with said arm being radially movable relative to such axis, whereby said satellite will revolve in an elliptical orbit around said globe at a higher speed than the rotation of the latter, and means associated with said supporting means for imparting said radial movement to said arm.

10. In a satellite globe structure, the combination of a hollow base, a globe rotatable on its polar axis and supported by said base, means for rotating said globe at a relatively slow speed, a supporting block pivotally carried by said base structure on an axis intersecting said globe, an arcuately shaped tubular satellite supporting member connected at its lower end to said block, a satellite, an arcuate satellite supporting arm at one end of which is carried said satellite, means carried by said supporting member for supporting said arm at the opposite end thereof for rotation about an axis intersecting said globe, means for rotating said arm, pivotal movement of said block being operable to vary the position of the axis of rotation of said satellite supporting arm, and means for retaining said block in any of its adjusted positions.

11. In a satellite globe structure, the combination of a hollow base, a globe rotatable on its polar axis and supported by said base, means for rotating said globe at a relatively slow speed, a supporting block pivotally carried by said base structure on an axis intersecting said globe, an arcuately shaped tubular satellite supporting member connected at its lower end to said block, a satellite, an arcuate satellite supporting arm at one end of which is carried said satellite, means carried by said supporting member for supporting said arm at the opposite end thereof for rotation about an axis intersecting said globe with said arm being radially movable relative to such axis, an elliptical cam carried by said last-mentioned supporting means, means for rotating said arm, the latter having a transversely extending offset engageable with said cam, spring means engageable with said arm operative to maintain said offset in engagement with said cam whereby said satellite will revolve in an elliptical orbit around said globe at a higher speed than the rotation of the latter, pivotal movement of said block being operable to vary the position of the axis of rotation of said supporting arm, and means for retaining said block in any of its adjusted positions.

References Cited in the file of this patent
UNITED STATES PATENTS

| 1,290,664 | Russell et al. | Jan. 7, 1919 |
| 2,102,413 | Hall | Dec. 14, 1937 |
| 2,226,032 | Wahlberg | Dec. 24, 1940 |
| 2,825,151 | Farquhar | Mar. 4, 1958 |